United States Patent [19]
Westfall

[11] 3,718,279
[45] Feb. 27, 1973

[54] FORCE BALANCE INSTRUMENT FOR COMPUTING
[75] Inventor: Norman Roy Westfall, Ogden, N.Y.
[73] Assignee: Sybron Corporation, Rochester, N.Y.
[22] Filed: May 28, 1971
[21] Appl. No.: 147,991

[52] U.S. Cl............................235/200 WB, 137/85
[51] Int. Cl................................................G06d 1/12
[58] Field of Search.......235/200 R, 200 WB; 137/85

[56] References Cited
UNITED STATES PATENTS

| | | | |
|---|---|---|---|
| 2,967,537 | 1/1961 | Morris | 235/200 WB |
| 2,970,476 | 2/1961 | Cary | 235/200 WB X |
| 3,047,002 | 7/1962 | Jaquith | 137/85 |
| 3,159,343 | 12/1964 | Hudson | 235/200 WB |
| 3,371,862 | 3/1968 | Bowditch et al. | 235/200 WB |
| 3,401,573 | 9/1968 | Beach et al. | 137/85 X |

Primary Examiner—Richard B. Wilkinson
Assistant Examiner—Lawrence R. Franklin
Attorney—Theodore B. Roessel

[57] ABSTRACT

A mechanical computer wherein thrust of a first bellows is force-balanced by a deflectable lever against the thrust of a second bellows, and third bellows varies the moment arm of the thrust of the second bellows on the lever. This moment arm is prevented from becoming zero by providing an arm on said lever through which the thrust of the third bellows beings to provide a moment in the same sense as the moment of the thrust of the first bellows.

The moment of the thrust of the second bellows is applied to the first lever through a second lever at a point of the first lever determined by the thrust of the third bellows. As the second lever has to deflect in two different directions simultaneously, it is provided with a flexure pivot having a stiff elastic rod allowing universal flexing, and also may have a relatively limber elastic flat strip arrangement fixing the rod's center of flexing.

12 Claims, 3 Drawing Figures

PATENTED FEB 27 1973
3,718,279
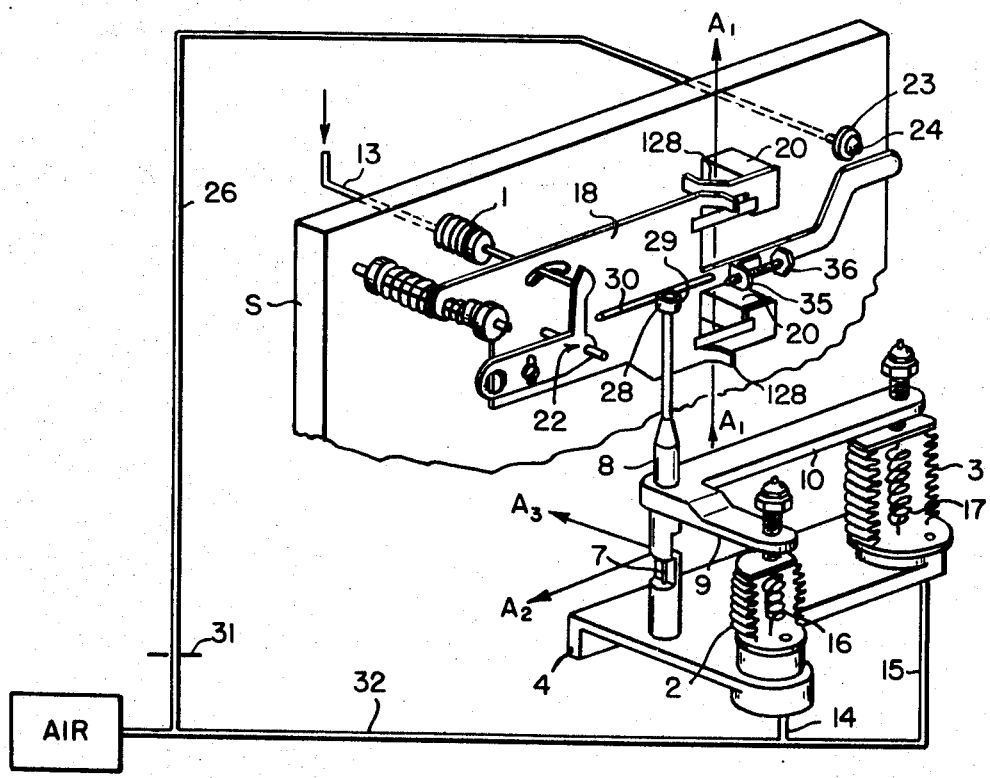
FIG. 1
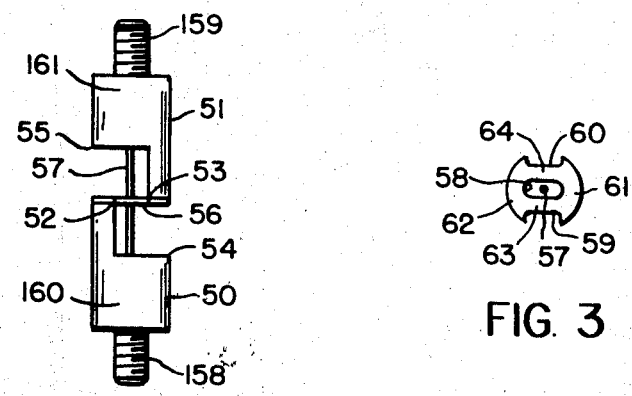
FIG. 2
FIG. 3

FORCE BALANCE INSTRUMENT FOR COMPUTING

FIELD OF THE INVENTION

The invention relates to the art of computing, more particularly to computing mechanism of the sort used in process control for measuring fluid flow, pressure ratios, and like parameters which are not directly measurable as a straight-line function of a single process variable, such as pressure, temperature, or the like.

DESCRIPTION OF THE PRIOR ART

Typically, mechanism of this sort is based on mechanism including a lever to which one or more forces are applied which reflect measures of one or more process variables for deflecting the lever in accordance with some mathematical equation. The resulting deflection of the lever is measured indirectly by causing one or several of the forces to actually prevent or otherwise neutralize the deflection, so that a measure of this force or these forces is a solution of the equation. For example, one of the forces may represent the pressure drop across a restriction in a conduit through which fluid flows. Generally, the flow rate is proportional to the square root of the pressure drop across the restriction, so the pressure drop force is balanced by varying the level of a second force and the place of application of the second force on the lever. Consequently, as is well-known, the second force varies as the square root of the first force. Conversely, if the second force is the process variable, and the first force is used for rebalancing, one may obtain the square of the second force by measuring the first force. The mechanism described is more generally a multiplier or divider, that is, squaring is merely a special case of multiplication and taking the square root is merely a special case of division. This may be epitomized as a relationship of three forces, $F_1$, $F_2$ and $F_3$ applied to three effective lengths of moment arms of the ever $L_1$, $L_2$, $L_3$ $$F_1 L_1 + F_2 L_2 + F_3 L_3 = 0 \quad (1)$$

In the square case $F_2 = F_3$; $L_3 = L_2 - kF_2$ (where $k$ is some apparatus constant), $F_2$ and $F_3$ oppose $F_1$, and $L_1$ is constant:

$$F_1 = (k/L_1) F_2^2 \quad (2)$$

If $F_2$ represents pressure drop $P_2 - P_1$, then $F_2$ represents flow rate, since $$F_2 = (L_1/k) F_1 \quad (3)$$

If $F_2 = F_3$, then there is ordinary multiplication, $$F_1 = (k/L_1) F_2 F_3 \quad (4)$$

Or there is division, $$F_2 = (L_1/k)(F_1/F_3) \text{ or } F_3 = (L_1/k)(F_1/F_2) \quad (5)$$

SUMMARY OF THE INVENTION

In many cases, real mechanisms, corresponding to the foregoing equations, have a zero problem, which problem is solved in the present invention by providing another lever which modifies the action of the computing mechanism when one lever arm becomes zero, or differs from zero by a predetermined amount.

Also, according to the invention, the variable moment arm of one force on the first-mentioned lever is exerted by still another lever which is pivoted for deflection by a pivot comprising a stiff, inextensible wire or rod.

Further, according to the invention, such pivoting may be provided by a flexure device including said rod in combination with an elastic web which, while it will flex in order to accomodate such deflection, is substantially indeformable and thereby substantially prevents translation of one said lever with respect to the other, during deflection of the latter said lever.

BRIEF DESCRIPTION OF THE DRAWINGS

FIG. 1 is a perspective view of a force balance instrument for computing in accordance with the invention.

FIG. 2 is an enlarged elevation of a detail of FIG. 1, and FIG. 3 is a plan view of a detail of FIG. 2.

In FIG. 1, a rigid support S has bellows 1 fixed thereto. Bellows 2 and 3 are fixed to a base plate 4 which is rigidly fixed to support S by means not shown.

The upper end of an elastic pivot 7, the basic element of which is a stiff elastic wire or rod, is rigidly fixed by suitable means not shown to a lever 8 having arms 9 and 10, respectively secured to the free ends of bellows 2 and 3 by any suitable means. Likewise, the lower end of pivot 7 is rigidly fixed to base plate 4.

As shown, the bellows have respective pressure connections 13, 14 and 15 by means of which fluid under pressure, typically air, is admitted to them. As the pressures within the bellows will have a level different from the external atmospheric pressure, typically 3 psig or greater, bellows 2 and 3 will exert moments on the lever 8 about axes $A_2$ and $A_3$ defined by pivot 7. These moments as shown will be a function of bellows stiffness, stiffness of pivot 7, and tension of the bellows' internal bias springs 16 and 17. In particular, each bellows would exert a moment on the lever 8 proportional to its effective area, the difference between the pressures interior to and exterior to the bellows, and the effective length of its moment arm. This effective length is approximately, in the case of bellows 3, say, the distance along axis $A_2$ between the center line of bellows 3 and the axis $A_3$. Actually, of course, the moment arm length cannot be so precisely known from the geometry of the device, but the operation of the instrument does not depend on precisely knowing this or any other moment arm length involved.

These bellows moments are partly balanced by the stiffness of wire 7, stiffness of the bellows, and stiffness of the springs 16 and 17, since the tendency of the bellows to expand is resisted by these stiffnesses, which may be considered constant and substantially free of hysteresis and friction effects. Consequently, each of bellows 2 and 3 deflect beam 8 in proportion to the respective differences in their internal and external pressures, and the individual deflections cause a net deflection of lever 8 about an axis in the plane defined by axes $A_3$ and $A_2$ (if they are coplanar) or at least in a plane parallel to both axes, but oriented in a direction determined by the relative contributions of bellows 2 and 3 to the net deflection.

The foregoing arrangement corresponds to that claimed and described in U.S. Pat. No. 3,047,002, to H. R. Jaquith, and assigned to the predecessor of the present assignee, and reference may be had thereto for further information about arrangements of this sort.

A further lever 18 is pivoted to rigid posts 20 rigidly secured to support S, by any suitable pivot means providing for deflection of lever 18 about an axis $A_1$ which runs transverse to both axes $A_2$ and $A_3$. As shown, pivots 28 are of the familiar crossed strip type, and limit the lever 18 to deflection about the axis $A_1$. Preferably, and as shown, axes $A_1$, $A_2$ and $A_3$ run orthogonally, namely, each is directed at right angles to the directions of the other two.

A spring 21 is provided at one end of lever 18 to resist deflection of lever 18 about axis $A_1$, and the bellows 1 is provided with suitable means 22 securing it to lever 18.

The other end of lever 18 is located adjacent a nozzle 23 and is formed as baffle for the opening 24 of the nozzle. Nozzle 23 is rigidly mounted on support S, and pressure connection 26 is provided for admitting fluid under pressure, typically air, to the nozzle.

Lever 8 has a roller bearing 28 on its upper end, its inner race (not shown) being fixed to the lever and its outer race 29 contacting a track 30 integral with the side of lever 18. Track 30 may be merely a surface finish on lever 18 such as to as nearly as possible define a frictionless contact with the outer surface of race 29, but is preferably in the form of the surface polished right circular cylinder welded to lever 18, so as to provide very nearly a point contact.

In typical use as, say, a square root computer, air at pressure $P_1$ varying in the range of 3-15 psig is admitted to bellows 1 via connection 13, thereby producing force $F_1$ on lever 18. Typically, $P_1$ will be directly proportional to the magnitude of the pressure drop across a restriction through which fluid flows.

A source of air, so labeled, under pressure of, say, about 20 psig, is admitted via an orifice 31 and piping 26 to nozzle 23, and via piping 32 and connections 14 and 15 to bellows 2 and 3.

Normally, the parts of the instrument may be so adjusted that with 3 psig in bellows 1, the surface of lever 18 adjacent nozzle 23 will be just close enough to impede escape to atmosphere of air from nozzle 23 to create pressures in bellows 2 and 3 somewhat larger than that external to the bellows. Conventionally, the pressures in the bellows 2 and 3 also would be 3 psig, since that is a standard zero value in pneumatic instrumentation.

The 3 psig in bellows 1, for the moment, may be supposed to correspond to zero pressure difference across the aforesaid restriction, i.e., there is no flow through the restriction. If flow occurs through the restriction, the pressure difference departs from zero, thereby causing an instrument (of a conventional sort measuring the difference and producing the said 3 psig in bellows 1) to increase the pressure in bellows 1 by an amount straight-line proportional to the pressure difference.

As a result of the non-zero pressure difference, the force due to bellows 2 on the lever 18 increases, deflecting the lever 18 further from the nozzle 23, thereby further impeding flow out of the nozzle. Consequently, the pressures in bellows 2 and 3 increase in like amounts. Looking at FIG. 1, it will be seen that these increases cause bellows 2 to increase its moment about axis $A_2$, and to cause bellows 3 to deflect lever 8 along axis $A_3$, away from the nozzle. The force and moment arm length of lever 8 on lever 18 each increase and each opposes the deflection of lever 18 toward the nozzle. In essence, the arm 18 throttles the nozzle just short of enough to cause the moment of lever 18 to deflect the lever 18 away from the nozzle 23. In practice, over the range of about 3-15 psig, the lever 18 does not change its position by more than a thousandth of an inch. In other words springs, dimensions, stiffnesses, etc., are so chosen, that the change in moment due to lever arm 8 is enough to balance the moment due to pressure in bellows 1.

Preferably, the parts of the mechanism are so oriented that lever 8 moves as nearly as possible parallel to the lever 18, under the influence of bellows 3, the idea being that bellows 3 should not deflect lever 8 against or away from the lever 18. Arm 8, in turn, is made relatively long so that roller 29 tends to move in a straight line parallel to the track 30. None of these ideal conditions are obtained of course. However, the nearly-stationary position of lever 18 minimizes tendency of bellows 3 to deflect lever 8 toward or away from lever 18. The slightly curved path of race 29, the outer surface of which is right cylindrical, requires the outer surface to slide as well as roll, but the finish of track 30 and of the race 29 minimizes sliding friction.

Since the force balance action of the instrument depends on the balance of moments about axis $A_1$, the moment arm of lever 8 about axis $A_1$ should not be allowed to become so nearly zero that, under the conditions in which the instrument operates, there is a likelihood that bellows 3 may be called upon to drive the roller to axis $A_1$ and beyond, since then the sense of the moment will reverse.

Further, it is preferable to prevent the moment arm from becoming so close to zero that the instrument is operating in a region of the square root function wherein the slope of the function is so steep that a change in $P_1$ can call for as much as, or more than an about ten-times larger change in output. Ordinarily, this region will be about the first one percent of the range of the instrument. Within this region the instrument is as sensitive to various influences due to the conditions of use, as it is to changes in $P_1$ within said region. For instance, vibration, transient disturbances in the air supply, and the like, will be preceived by the instrument as if they were changes in $P_1$ requiring the feedback pressure to change to a value corresponding to a value of $P_1$ somewhere in the first ten percent of the range of $P_1$. This is particularly undesirable where the zero pressure level is 3 psig, since while the user's application of the instrument will usually tolerate instability of the output within the first percent of the range of $P_1$, the user is likely to perceive the instrument as malfunctioning.

According to the invention, the foregoing difficulties are prevented, by means of a rigid lever arm 35, fixed to, or forming part of the pivoted end of lever 18, and having a screw 36 threaded therein and projecting through the lever arm 35 into the path of race 29. Screw 36 is located so that it can contact the race 29 at a point thereon normal to the outer surface of the race. The length of the screw is such that it can be adjusted toward the race enough to prevent the moment arm of lever 8 on lever 18 from becoming less than some predetermined value greater than zero. As will be seen later, this "predetermined value" corresponds to the smallest value of $P_1$ from which it is desired to extract the square root.

In any event, if race 29 just contacts screw 36, at the aforesaid smallest value of $P_1$, and if then the pressure in bellows 1 decreases below that value, the resultant decrease of force due to bellows 2 and 3 will act through fixed lever arms about axis $A_1$, so that both the resulting moments have the effect of moving lever 18 closer to nozzle 23. This, however, increases the pressures in bellows 2 and 3, whereupon the lever 18 moves away from nozzle 23. The net result is that as long as race 29 contacts the screw 36, bellows 3 forces lever 18 to maintain a substantially fixed position. During such contact, bellows 2 plays little or no role in positioning lever 18, because at about the time the race 29 contacts screw 36, race 29 actually disengages from track 30. Hence, the instrument operates as a simple force balance device in which the moment of bellows 1 is balanced against the moment of bellows 3.

With bellows 3 force balancing lever 18 through lever 35, the pressure in bellows 3 will follow the pressure in bellows 1 in straight-line relation, even if the latter drops to a point corresponding to a reversal of the normal sense of the moment of bellows 2 or lever 18 (which would actually happen, if screw 36 were not adjusted to prevent roller 28 from being driven so far by bellows 2). Accordingly, the parts of the instrument can be adjusted so that at the zero level of the pressure in bellows 1, the pressure in bellows 3 (and bellows 2) will also be at zero level.

It is, of course, necessary to proportion the parts such that in the first one percent of the range and preferably beyond (i.e., to negative values), the race 29 does not also disengage from screw 36 or vary excessively the direction of its thrust against the screw. In a real instrument, the bellows 2 cannot pull the race so far from track 30 that it is likely that any otherwise appropriate proportioning of the parts would allow the possibility of race 9 disengaging from screw 36, or of significantly varying the angle at which it thrusts at the screw.

During the foregoing conditions of operation, the instrument is substantially totally insensitive to disturbances, since, whatever the cause, any change in spacing between baffle and nozzle is quickly nullified by small changes in pressure in bellows 3.

Present day real instruments of the sort described should be calibrateable to an accuracy of ±0.25 percent of the range of input, e.g., (3–15) psig. Without the present invention, however, input errors (and disturbances) are greatly magnified in about the first one percent of the range of the instrument. For instance, if the zero lever of $P_1$ was 0.25 percent of input range error, the pressure in bellows 2 and 3 would be at a level indicating that $P_1$ was above its zero level by about 5% of range. With the present invention, the instrument may be adjusted so that race 29 just contacts screw 36 when the effective lever arm of lever 8 or lever 18 corresponds to $P_1$ having a value greater than its zero value, by 0.75 percent of $P_1$'s range. In this condition, the instrument will have the desired ±0.25 percent accuracy from 0.75 percent of range to 100 percent of range, and though it is not computing square root in the 0 to 0.75 percent part of its range, its output nowhere in this lesser part will be off by more than 0.25 percent, and the output of the instrument will be substantially perfectly stable therein, i.e., disturbance-free.

As shown in FIG. 2, the pivot 7 includes members 50 and 51 which, as can be seen from FIG. 1, are right circular cylinders. The cylinders are cut away, however, at one end, to provide steps 52 through 55. Members 50 and 51 are connected together by a flexure 56 fixed to steps 52 and 53, and by a straight stiff rod or wire 57, preferably circular in cross-section, fixed at its ends to steps 54 and 55. Members 50 and 51 have respective threaded studs 158 and 159 for rigidly securing them to lever 8 and plate 4, respectively.

As shown in FIG. 3, flexure 56 is essentially a circular disc cut away to form an oblong central hole 58, and edge notches 59 and 60. The lunate elements 61 and 62 of the flexure provide for fixing the flexure to the steps 52 and 53, and by welding the surfaces of the elements to the next-adjacent surfaces of the steps 52 and 53, in such fashion that said elements effectively become integral portions of members 50 and 51. Consequently, the actual flexural element is the pair of rectangular strips 63 and 64, defined by the parallel-sided notches 59 and 60, and hole 58.

As will be seen from FIG. 3, the cross-section of rod 57 and the contour of flexure 56 are concentric. Further, the members 50 and 51, and the rod 57 have the same cylinder axis, the plane of the strips 63 and 64 is perpendicular to this axis, and the strips are bilaterally symmetric with respect to the diameter of flexure 56 parallel to the sides of the strips.

The pivot 7 functions basically as described in the aforesaid Jaquith patent. However, as this patent discloses a stiff rod alone, while providing for deflection in any sense about a given point, allows this point to shift about in space, in directions transverse to the length of the rod. In the present invention this would result in translation of the lever 8 parallel to the plane defined by axis $A_2$ and $A_3$, as well as deflection of the lever 8 about these axes. However, the principle of operation of the instrument does not take into account such translation, so according to the invention, flexure 56 is provided to prevent such translation, or in other words, to prevent the aforesaid given point from shifting about, so that in effect the lever 8 is constrained to deflect about the intersection of axis $A_2$ and $A_3$.

The desired effect of the flexure is to provide a connection between members 50 and 51 which is effectively rigid with respect to forces the direction of which are in the plane of the flexure, that is, the material of flexure is indeformable in its plane, so to speak, but is elastically deformable by forces the directions of which intersect said plane.

Flexure 56 is not actually planar, since it must have some thickness, but it is accurate, as a practical matter, to consider it a planar element. The fact that it has thickness, however, is reflected by the notches 59 and 60 and the hole 58. The symmetry of these assures that the elastic resistance of the pivot to deflection about the intersection of axes $A_1$ and $A_2$ does not vary with the direction of deflection. Hole 58 is required, of course, to accommodate rod 57, but also reduces the tendency of the flexure 56 to buckle, a natural tendency of plate-like members.

It is to be observed that FIGS. 2 and 3 are to scale, (except that the thickness of flexure 56 and the diameter of rod 57 are slightly exaggerated for drafting convenience.) Thus, the portion of rod 57 visible in FIG. 1 may be ¾ inch in length by 1/32 inch in diameter. The thickness of the flexure 56 may then be 1/64 inch. All parts of the pivot are metal, and in particular rod 57 and flexure 56 are stainless steel.

The pivot according to the invention closely approximates a ball and socket joint, the pivot point of which is the intersection of flexure 56 and rod 57. However, unlike such joint, pivot 7 is perfectly frictionless and hysteresis free.

As described herein, pivot 7 is a flexure device having no preferred direction of pivoting, e.g., the rod 57 is a right circular cylinder. In some cases, it may be desirable to provide a rod shape other than circular. For example, for the purposes of FIG. 1, the rod 57 may have a square or rectangular cross-section, a pair of opposite sides of which are parallel to the sides of strips 64. The effect of this modification would be to more favorably distribute bending stresses in the rod due to the deflections of lever 8 in the planes defined by $A_1$ and $A_2$ with a straight line perpendicular to $A_2$ and $A_3$ at their intersection. This and other modifications of the cross-section of rod 7 are deemed to be within the scope of the invention.

In the foregoing, the present invention has been set forth with reference to specific structural realizations of the principles thereof. However, these principles may be otherwise realized and/or supplemented.

For example, the illustrated embodiment uses bellows as pressure responsive devices. Obvious equivalents of these are diaphragms, pistons, Bourdon tubes, and so on, since these intrinsically or in combination with springs of one sort and another, can be used to exert pressure-proportional forces and displacements on the type of lever arrangement shown.

Again, explanation has been in terms of pneumatic pressure, flow rate, etc., but numerous hydraulic pressure, electrical and magnetic devices are known which can be used to exert forces and displacements in response to hydraulic, electrical and magnetic energies.

Further, flexure types of pivots have been shown, but by no means exhaust the gamut of pivot types which could be used for the several levers.

Still further, various accessories may be used with the instrument. For example, in practice a so-called booster relay would commonly be inserted in the line 32, to boost the effect of pressure changes in nozzle 23 on bellows 2 and 3 and/or a pressure gauge, recorder or the like may be connected to the pressure in bellows 2 and 3 to provide a record or indication of such pressure, in terms of flow rate. Indeed, the position of lever 8 along lever 18 is such indication.

Finally, the instrument according to the invention is generally useful as a mechanical computer for computing in multiplying or dividing fashion, and could be applied to control the flow rate or other condition or conditions it computes.

The foregoing modifications, refinements, accessories, and/or many others which will be obvious to those skilled in the art, can be adopted without departing from the invention as claimed herein.

I claim:

1. A pneumatic force balance instrument, said instrument including a support, a first pivot fixed to said support, a first lever fixed at one end to said first pivot for deflection about a first axis;

a second pivot fixed to said support, a second lever fixed at one end to said second pivot for deflection about a second axis and a third axis simultaneously;

said second lever's length lying transverse to said first lever and contacting the side thereof, each of said axes running at a right angle to the others;

a first bellows fixed to said support for deflecting said first lever about said first axis and hence toward and away from said second lever;

a second bellows fixed to said support for deflecting said second lever about one axis of said second and third axes and a third bellows for deflecting said second lever about the other axis of said second and third axes, and hence along said second lever and toward and away from said first axis;

a first variable pressure source connected to said first bellows, a second variable pressure source connected to both said second and third bellows;

pressure source varying means on said support for varying the pressure of one of said first and second variable pressure sources, said pressure source varying means being responsive to deflection of said first lever out of a given position in response to deflection thereof due to variation of the pressure of the other of said first and second sources, said pressure source varying means being so responsive to said deflection as to cause the pressure of said one source to vary in such sense as to cause said second lever to deflect opposite to the first said deflection;

said first lever having an arm projecting therefrom on the side thereof contacted by said second lever, said arm being located to prevent said second lever from deflecting toward said first axis so far that the effective length of said first lever's moment arm between said axis and the contact between said lever arms, is less than a predetermined amount.

2. The instrument of claim 1, wherein said one variable pressure source is said second variable pressure source, and the said first variable pressure source is variable in response to a condition varying independently of said instrument;

said second lever being arranged to contact said arm when the pressure in said first bellows becomes sufficiently small that it is desirable to decrease the sensitivity of the response of said pressure source varying means to deflection of said first lever out of said given position by second lever.

3. A force balance instrument, said instrument including a support, a first pivot fixed to said support, a first lever fixed at one end to said first pivot for deflection about a first axis;

a second pivot fixed to said support, a second lever fixed at one end to said second pivot for deflection about a second axis and a third axis, each one of said first, second and third axes being at right angles to the others thereof;

said second lever's length lying transverse to said first lever and contacting the side thereof;

a first force producing means fixed to said support for deflecting said first lever about said first axis and hence toward and away from said second lever;

a second force producing means fixed to said support for deflecting said second lever about said second axis;

a third force producing means fixed to said support for deflecting said second lever about said third axis;

force varying means on said support for varying the force produced by one of said force producing means, said force varying means being responsive to deflection of said first lever out of a given position in response to deflection thereof due to variation in force produced by one of said force producing means, said force varying means being so responsive to said deflection as to cause the force produced by said one of said force producing means to vary in such sense as to cause said second lever to deflect opposite to the first said deflection.

4. The force balance instrument of claim 3, wherein said first lever has an arm projecting therefrom on the side thereof contacted by said second lever, said arm being located to prevent said second lever from deflecting toward said first axis so far that the effective length of said first lever's moment arm between said axis and the contact between said lever arms, is less than a predetermined amount.

5. The force balance instrument of claim 3, wherein said second pivot is a stiff inextensible wire rigidly fixed at one end to said support and rigidly fixed at its other to said second lever for supporting said second lever arm deflection about said second axis, said second force producing means being located so as to apply force to said second lever arm on a moment arm at normal to said second axis, the effective length of said wire being oriented to permit deflection of said second lever arm toward and away, respectively, from said first lever arm, and from said first axis.

6. The force balance instrument of claim 3, wherein said second pivot includes a stiff inextensible wire rigidly fixed at one end to said support and rigidly fixed at its other to said second lever for supporting said second lever arm deflection about said second axis, said second force producing means being located so as to apply force to said second lever arm on a moment arm at normal to said second axis, the effective length of said wire being oriented to permit deflection of said second lever arm toward and away, respectively, from said first lever arm, and from said first axis;

said second pivot also including a flexible web, indeformable in its plane, rigidly fixed to said support and to said second lever, and having its plane transverse to said wire, and said wire passing through said web.

7. A force balance instrument including in combination, a first rigid lever arm pivoted at one end to a support for deflection about a given axis fixed with respect to said support;

a second rigid lever arm pivoted at one end to said support for deflection about said given axis, said one ends of said arms being fixed together so that moments on both said levers are summed together;

first force producing means fixed to said support for applying first force to said first lever arm at a place thereon spaced from said given axis;

second force producing means fixed to said support for applying second force to said first lever arm at a place thereon spaced from said given axis;

said first and second forces being so directed that each thereof creates a moment on said first lever arm opposed in sense to the moment of the other thereof for causing said lever to deflect about said axis in the sense of the larger of the moments of said first and second forces;

detecting and force varying means responsive to said deflection for causing one of said first and second force producing means to vary its force in such sense as to cause said first lever arm to deflect in a sense opposite to said deflection;

force translating means responsive to a third force for changing the place of application to said first lever arm of one of said first and second forces for varying the spacing between said place and said given axis as a function of the magnitude and sense of said third force, there being third force producing means connected to said force translating means for applying force thereto;

a rigid member connected to that one of said force producing means producing said one of said forces, said rigid member contacting said first lever arm for being slid along said first lever arm by said force translating means, toward and away from said given axis, and while being urged against said first lever arm by said one of said force producing means;

said second lever arm being located so that if said member is slid toward said given axis, said member contacts said second lever arm at a place thereon spaced from said given axis, whereby to exert a moment on said second lever arm opposing one of the moments due to said first and second forces.

8. The force balance instrument of claim 7 wherein said rigid member is one end of a third rigid lever arm having its other end pivoted to said support by pivot means providing for simultaneous deflection of said second lever arm about second and third given axes, said second and third axes being directed transversely of each other and of the first said given axis;

said second force producing means being arranged to deflect said third lever arm about one of said second and third given axes, and said force translating means including said third force producing means for deflecting said third lever arm about the other of said second and third given axes; said second and third force producing means providing for deflection of said third lever arm, respectively toward and away from said first lever arm, and along the said first lever arm.

9. The force balance instrument of claim 8, wherein said pivot means is a stiff inextensible wire rigidly fixed at one end to said support and rigidly fixed at its other end to the said other end of said third lever arm, the effective length of said wire being oriented to permit deflection of said third lever arm toward and away, respectively, from said first lever arm, and from the first said given axis.

10. The force balance instrument of claim 7 wherein said rigid member is arranged to contact said second lever arm, at said place thereon when the other of said first and second forces is sufficiently small that it is desirable to reduce the sensitivity of response, to said deflection of said first lever arm, of said detecting and force varying means, when the last said deflection of said first lever arm is due to said one of said first and second forces.

11. A pressure responsive device of the type having a support, a lever, pressure responsive means fixed to said support and to said lever for deflecting said lever toward and away from said support about an axis passing through a given point, said pressure responsive means being a pair of pressure responsive elements fixed to different portions of said lever; said device having a flexure device fixed to said support and to said lever for mounting said lever to said support and defining said given point;

said flexure device comprising, in combination, a first member and a second member, each said member being spaced, one from the other; an inextensible, stiff, linear element having one end fixed to said first member and its other end fixed to said second member, whereby to fix the spacing between said members; said first member and said second member each having a portion extending toward the other and alongside said linear element, and lying on opposites of said linear element; there being a flexible web, inextensible in its plane, and having its plane transverse to said linear element, said web being fixed to both said portions, and said first member being said support and said second member being said lever;

said pressure responsive device also having a second lever mounted on said support for deflection about a given axis, and a third pressure responsive element fixed to said support and to said second lever for so deflecting said second lever;

said pair of pressure responsive elements being located with respect to each other and to said flexure device for pivoting the first said lever toward and away from said second lever, and also along the length thereof, toward and away from said given axis;

said levers being mechanically connected together for causing deflection of said second lever to exert a moment on said first said lever, and there being means for applying fluid pressure to said pressure responsive elements, whereby the net moment on said second lever is a function of the responses of said pressure responsive elements to such fluid pressure.

12. The pressure responsive device of claim 11, wherein the last said means is responsive to deflection of said second lever by said third pressure responsive element to apply said fluid pressure to said pair of pressure responsive elements, for causing said pair of pressure responsive elements to deflect said second lever in accordance with deflection of said first said lever, for causing deflection of said second lever to be force balanced by deflection of said first said lever.

* * * * *